2,926,165

OXYMETHYLGUANAMINES

Seymour L. Shapiro, Hastings on Hudson, Louis Freedman, Bronxville, and Vincent A. Parrino, Bayside, N.Y., assignors to U.S. Vitamin Corporation, New York, N.Y., a corporation of Delaware No Drawing. Application November 26, 1958
Serial No. 776,416

6 Claims. (Cl. 260—249.9)

This invention is concerned with novel triazine compounds which have valuable physiological properties.

More particularly, the present invention is concerned with selected triazine compounds which have hypnotic, sedative and anticonvulsant properties which are embodied by the formula $$\text{I}$$

(CH$_2$OR$_1$ triazine structure with Z and NH$_2$ substituents)

wherein $R_1$ is a member of the group consisting of hydrogen and methyl, and Z is selected from the group consisting of m-chloroanilino and m-bromoanilino, and substituted o-toluidino, said o-toluidino substitutents being selected from the group consisting of ring-substituted methyl, chlorine and bromine, and N-ethyl. The substituted guanamines of this invention can thus be classified as selected 2-amino-4-arylamino-6-oxyalkyl-s-triazines.

The compounds of this invention are conveniently prepared by the reaction of the suitably substituted aryl biguanides with the appropriately substituted acid chloride or ester according to the following equation.

$$Z-C(NH)(NH)-C-NH_2 + EtO-\overset{O}{\underset{\|}{C}}-CH_2OR_1 \longrightarrow \text{product (I)}$$

$$(Cl-\overset{O}{\underset{\|}{C}}-CH_2OR_1)$$

In the practice of the invention, the biguanide in the form of its free base is added to methanol, or its hydrochloride is converted to the free base by addition of one equivalent of sodium methoxide in methanol and an equivalent quantity of the reactant ester, $$EtO-\overset{O}{\underset{\|}{C}}-CH_2OR_1$$

added. An additional equivalent of sodium methoxide may be added to catalyze the reaction. The reaction mixture is allowed to stand at 20° C. for 24–96 hours and upon decantation into water, the product separates.

Alternatively, if the acid chloride $R_1$—OCH$_2$—COCl is used, the biguanide is suspended in aqueous acetonitrile containing sufficient sodium hydroxide solution to convert the biguanide hydrochloride to its free base, and to bind the formed hydrogen chloride of the reaction, the acid chloride is added slowly with continued stirring and maintenance of the internal temperature below 0° C. by external cooling. After addition is complete, the reaction mixture is allowed to warm to 20° C. and so maintained for 4–24 hours and then decanted into water, whereupon the product separates.

The aryl biguanides which are required as initial reactants in the synthesis of triazines of this invention are in turn conveniently prepared by reaction at reflux temperature of equivalent quantities of the aryl amine, 3 N hydrochloric acid and dicyandiamide. After a suitable reflux period, generally from 2–24 hours, upon cooling, the aryl biguanide hydrochloride precipitates from the reaction mixture and is separated.

Typical aryl biguanides used in this work are shown in Table I.

The required esters or acid chlorides were available commercially or were readily accessible through preparative methods described in the chemical literature.

TABLE I.—ARYL BIGUANIDES

| $R_2$ | $R_3$ | $R_4$ | HX | M.P., °C. |
|---|---|---|---|---|
| C$_2$H$_5$— | 2-CH$_3$— | H | HCl | 201–203 |
| H | 3-Cl— | H | HCl | 199–200 |
| H | 2-CH$_3$— | 4-Cl— | H$_2$O | 144–170 |
| H | 2-Cl— | H | HCl | 224–225 |
| H | 2-CH$_3$— | 3-CH$_3$— | HCl | 232–233 |
| H | 2-CH$_3$— | 4-CH$_3$— | HCl | 235–237 |
| H | 3-Br— | H | HCl | 187–188 |
| H | 2-CH$_3$— | 3-Cl— | HCl | 238–239 |
| H | 2-CH$_3$— | 5-Cl— | HCl | 199–201 |

Typical of the compounds prepared in this work are those listed in Table II; compounds which have been made for comparison are also included in Table II and are numbered with a prefix "C."

TABLE II.—2-AMINO-4-ARYLAMINO-6-OXYALKYL-s-TRIAZINES $R_1$=H

| No. | $R_2$ | $R_3$ | $R_4$ | M.P., °C. | LD$_{min}$.[a] | AC[b] |
|---|---|---|---|---|---|---|
| 1 | C$_2$H$_5$— | 2-CH$_3$— | H | 116–118 | 350 | 4+ |
| 2 | H | 3-Cl— | H | 161–163 | 350 | 4+ |
| 3 | H | 2-CH$_3$ | 4-Cl— | 221–223 | 350 | 4+ |
| C-1 | H | H | H | 186–187 | 200 | 1+ |
| C-2 | H | 2-Cl— | H | 185–186 | 450 | 0 |

$R_1$=—CH$_3$

| No. | $R_2$ | $R_3$ | $R_4$ | M.P., °C. | LD$_{min}$.[a] | AC[b] |
|---|---|---|---|---|---|---|
| 4 | H | 2-CH$_3$— | 3-CH$_3$— | 170–174 | 750 | 4+ |
| 5 | H | 2-CH$_3$— | 4-CH$_3$— | 155–157 | 1,000 | 3+ |
| 6 | C$_2$H$_5$— | 2-CH$_3$— | H | 145–147 | 300 | 3+ |
| 7 | H | 3-Cl— | H | 139–141 | 500 | 3+ |
| 8 | H | 3-Br— | H | 160–162 | 750 | 4+ |
| 9 | H | 2-CH$_3$— | 3-Cl— | 191–193 | 450 | 4+ |
| 10 | H | 2-CH$_3$— | 5-Cl— | 160–162 | 750 | 4+ |
| C-3 | H | H | H | 156–158 | 400 | 0 |
| C-4 | H | 4-CH$_3$— | H | 148–150 | 450 | 1+ |

[a] LD$_{min}$. is the minimum lethal dose as established by subcutaneous injection in mice.
[b] AC represents the anticonvulsant rating, and the method for evaluation is recorded by Shapiro et al., J. Am. Chem. Soc., 80, 1648 (1958).

It will be noted that in the instance where Z is an unsubstituted anilino group, substantially no activity is obtained. On the other hand, good anticonvulsant activity is obtained with compounds within the structural ambit of this invention.

In a similar manner, it has been established that when Z is an alkylamino or arylalkylamino group, little or no anticonvulsant action is obtained.

In addition to their utility as anticonvulsant agents, the compounds of this invention may be converted to new and useful chemical products by conversions at the functional —OH, and NH₂ groups, as for example, carbamates of the type

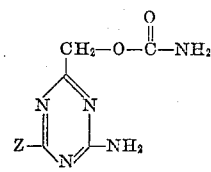

The compounds of this invention are weak bases and can form salts with the strong mineral acids such as hydrochloric, hydrobromic, sulfuric acid and the like.

The following preparations and examples are illustrative of the composition and processes of this invention but are not to be construed as limiting.

*Example 1.—2-amino-4-(N-ethyl-[o-methyl]anilino)-6-(hydroxymethyl)-s-triazine*

To a solution of 4.4 g. (0.062 mole) of sodium methoxide in 25 ml. of methanol there was added 7.2 g. (0.031 mole) of N'-ethyl,N'-(o-methylphenyl)-biguanide hydrochloride. The precipitated sodium chloride was not filtered. A charge of 3.2 g. (0.031 mole) of ethyl glycolate was added and the reaction maintained at 20° C. for 72 hours. The reaction mixture was decanted into 100 ml. of water and after 72 hours the formed precipitate of product (4.0 g.) was separated and recrystallized (acetonitrile), melting at 116–118° C.

*Analysis.*—Calcd. for $C_{13}H_{17}N_5O$: C, 60.2; H, 6.6; N, 27.0. Found: C, 60.2; H, 6.5; N, 26.8.

*Example 2.—2-amino-4-(m-chloroanilino)-6-(hydroxymethyl)-s-triazine*

In a manner similar to that described for Example 1, and using (m-chlorophenyl)biguanide hydrochloride in a 0.05 mole run, there was obtained 6.7 g. of product, which recrystallized (ethanol) melted at 161–163° C.

*Analysis.*—Calcd. for $C_{10}H_{10}ClN_5O$: C, 47.9; H, 4.0; N, 27.8. Found: C, 47.6; H, 4.2; N, 27.6.

*Example 3.—2-amino-4-(2,3-dimethylanilino)-6-(methoxymethyl)-s-triazine*

A solution of 5.9 g. (0.025 mole) of (2,3-dimethylphenyl)biguanide hydrochloride in 25 ml. of methanol was treated with 12 ml. (0.025 mole) of 23% sodium methoxide in methanol, followed by 2.6 g. (0.025 mole) of methyl methoxyacetate. The reaction mixture was maintained at 20° C. for 24 hours and then decanted into 60 ml. of water. After 72 hours, the formed precipitate of product (4.9 g.) which separated was recrystallized (acetonitrile) and melted at 170–174° C.

*Analysis.*—Calcd. for $C_{13}H_{17}N_5O$: C, 60.2; H, 6.6; N, 27.0. Found: C, 60.0; H, 6.3; N, 26.8.

*Example 4.—2-amino-4-(m-bromoanilino)-6-(methoxymethyl)-s-triazine*

In a manner similar to that described for Example 3, and using (m-bromophenyl)biguanide hydrochloride, there was obtained 4.5 g. of product in a 0.02 mole run which recrystallized (acetonitrile), melted at 160–162° C.

*Analysis.*—Calcd. for $C_{11}H_{12}BrN_5O$: C, 42.5; H, 3.9; N, 22.6. Found: C, 42.5; H, 4.0; N, 23.2.

*Example 5.—2-amino-4-(3-chloro-2-methylanilino)-6-(methoxymethyl)-s-triazine*

In a manner similar to that described for Example 3, and using (3-chloro-2-methylphenyl)biguanide hydrochloride there was obtained 3.1 g. of product in a 0.025 mole run which recrystallized (propanol), melted at 191–193° C.

*Analysis.*—Calcd. for $C_{12}H_{14}ClN_5O$: C, 51.5; H, 5.0; N, 25.0. Found: C, 51.6; H, 5.0; N, 25.0.

The novel compounds of this invention can be combined with solid or liquid pharmaceutical carriers and formulated into the form of tablets, powder packets or capsules, or, dissolved in suitable solvents for oral and parenteral administration for human or veterinary use.

It is to be understood that it is intended to cover all changes and modifications of the examples of the invention herein chosen for the purpose of illustration which do not constitute departure from the spirit and scope of the invention.

We claim:

1. A compound of the formula

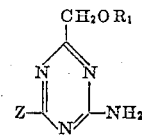

wherein $R_1$ is selected from the group consisting of hydrogen and methyl, and Z is selected from the group consisting of

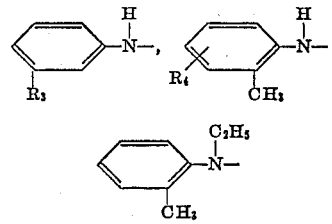

wherein $R_3$ is selected from the group consisting of chloro and bromo, and $R_4$ is selected from the group consisting of chloro, bromo and methyl.

2. The compound

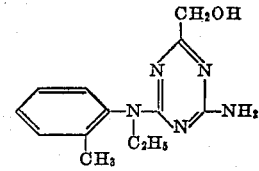

3. The compound

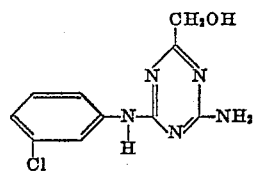

4. The compound

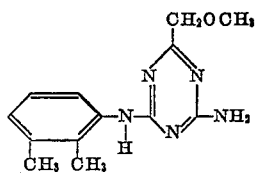

5. The compound

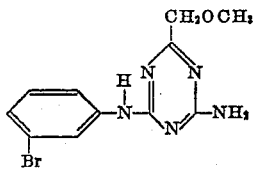

6. The compound

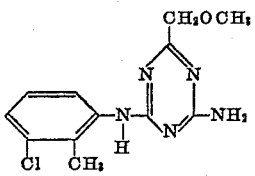

(References on following page)

References Cited in the file of this patent

UNITED STATES PATENTS

| | | |
|---|---|---|
| 2,309,663 | Oldham | Feb. 2, 1943 |
| 2,394,526 | Thurston | Feb. 5, 1946 |
| 2,777,848 | Schaefer | Jan. 15, 1957 |

OTHER REFERENCES

Overberger et al.: Journal of the American Chemical Society, vol. 76, pp. 1061 to 1065 (1954).

Overberger et al.: Journal of the American Chemical Society, vol. 76, pp. 1855 to 1858 (1954).